United States Patent
Zheng et al.

(10) Patent No.: US 11,412,776 B2
(45) Date of Patent: Aug. 16, 2022

(54) SMOKING PATH SIMULATION SYSTEM BASED ON ROBOTIC ARM

(71) Applicant: CHINA TOBACCO YUNNAN INDUSTRIAL CO., LTD, Kunming (CN)

(72) Inventors: Han Zheng, Kunming (CN); Jianbo Zhan, Kunming (CN); Hao Wang, Kunming (CN); Zhenhua Yu, Kunming (CN); Ying Zhang, Kunming (CN); Geng Li, Kunming (CN); Tingting Yu, Kunming (CN); Liang Cheng, Kunming (CN); Liwei Li, Kunming (CN); Tao Wang, Kunming (CN); Xu Wang, Kunming (CN); Haiyan Ding, Kunming (CN); Jiao Xie, Kunming (CN); Baoshan Yue, Kunming (CN); Jiang Yu, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/428,991

(22) PCT Filed: Jan. 21, 2021

(86) PCT No.: PCT/CN2021/073108
§ 371 (c)(1),
(2) Date: Aug. 6, 2021

(87) PCT Pub. No.: WO2021/212938
PCT Pub. Date: Oct. 28, 2021

(65) Prior Publication Data
US 2022/0142232 A1    May 12, 2022

(30) Foreign Application Priority Data

Apr. 22, 2020 (CN) .......................... 202010323425.1

(51) Int. Cl.
*A24C 5/34* (2006.01)
*G01N 21/84* (2006.01)
(Continued)

(52) U.S. Cl.
CPC ........... *A24C 5/3406* (2013.01); *G01N 21/84* (2013.01); *G01N 31/12* (2013.01);
(Continued)

(58) Field of Classification Search
CPC ...... A24C 5/3406; G01N 21/84; G01N 31/12; G01N 35/0099; H04N 5/2256; H04N 5/247
(Continued)

(56) References Cited

FOREIGN PATENT DOCUMENTS

| CN | 105628273 A | 6/2016 |
|---|---|---|
| CN | 205602639 U | 9/2016 |

(Continued)

*Primary Examiner* — Joseph G Ustaris
*Assistant Examiner* — Jimmy S Lee
(74) *Attorney, Agent, or Firm* — Bayramoglu Law Offices LLC

(57) ABSTRACT

A smoking path simulation system includes a case, the robotic arm fixedly provided in the case and a cigarette holder mounted at a working end of the robotic arm, and further includes a feeding device, a cigarette tapping device and a cigarette lighting device provided in the case and located at a periphery of the robotic arm, as well as an image acquisition device mounted at the working end of the robotic arm. With the smoking path simulation system, an action path of smoking a cigarette by a consumer may be simulated, and consistency of the simulated action paths may be guaranteed, thus effectively improving precision of test of indexes of a cigarette-combustion performance, such as cigarette-combustion ash integration characteristics, or the like.

2 Claims, 9 Drawing Sheets

(51) Int. Cl.
    *G01N 31/12*     (2006.01)
    *G01N 35/00*     (2006.01)
    *H04N 5/225*     (2006.01)
    *H04N 5/247*     (2006.01)

(52) U.S. Cl.
    CPC ....... *G01N 35/0099* (2013.01); *H04N 5/2256* (2013.01); *H04N 5/247* (2013.01)

(58) Field of Classification Search
    USPC ..................................................... 73/118.01
    See application file for complete search history.

(56)                        References Cited

FOREIGN PATENT DOCUMENTS

| | | |
|---|---|---|
| CN | 107328779 A | 11/2017 |
| CN | 108033262 A | 5/2018 |
| CN | 108037303 A | 5/2018 |
| CN | 111426789 A | 7/2020 |
| CN | 212433078 U | 1/2021 |
| EP | 0195173 A1 | 9/1986 |

| Shooting Angle | 1 | 2 | 3 | 4 | 5 |
|---|---|---|---|---|---|
| Angle 1# | 4.88 | 8.26 | 5.30 | 7.59 | 4.37 |
| Angle 2# | 4.94 | 6.48 | 6.21 | 8.25 | 5.36 |
| Angle 3# | 7.56 | 4.79 | 10.41 | 4.88 | 2.92 |

SMOKING PATH SIMULATION SYSTEM BASED ON ROBOTIC ARM

CROSS REFERENCE TO THE RELATED APPLICATIONS

This application is the national phase entry of International Application No. PCT/CN2021/073108, filed on Jan. 21, 2021, which is based upon and claims priority to Chinese Patent Application No. 202010323425.1, filed on Apr. 22, 2020, the entire contents of which are incorporated herein by reference.

TECHNICAL FIELD

The present invention pertains to the technical field of cigarette test equipment, and in particular, relates to a smoking path simulation system based on a robotic arm.

BACKGROUND

The cigarette smoking action of a consumer is a dynamic and static combined process. The whole action is mainly completed with an arm, and mainly includes typical actions such as cigarette lighting, smoking, multi-angle static cigarette holding, wrist overturning, and cigarette ash flicking. Currently, the test and research on relevant indexes of a cigarette smoking process merely depend on some of the above-mentioned typical actions, for example, the use of a smoking machine involves the actions of cigarette lighting and smoking, the test of a cigarette combustion end involves the actions of cigarette lighting, smoking, cigarette ash flicking, or the like. However, there is no device and system capable of including the actions of the whole cigarette smoking process and a smoking path for the research on the cigarette smoking process and state. In the cigarette smoking process, a fall of the cigarette combustion end, a test of an ash integration performance, flying ash, and an ash falling state are closely related to the whole cigarette smoking process action. Obviously, if the test of the cigarette combustion indexes is only conducted under the condition of the partial smoking action, an actual state of a cigarette in a real smoking state of the consumer cannot be simulated completely, which makes a test result lack objectivity, fails to precisely guide the related scientific research and production work, and even forms certain misguidance.

With the development of social economy and the improvement of life quality, the consumer has increasing requirements for the quality of the cigarette, and pays more and more attention to a cigarette combustion state in the cigarette smoking process. Since the cigarette combustion state is a product feature that may be visually captured by the consumer, the research on the related indexes in the cigarette combustion process is always an important direction of cigarette research. How to accurately detect the cigarette combustion state and the related indexes is the key for guiding the cigarette research, optimizing a product and improving the quality.

To this end, in conjunction with actual demands, a complete simulation system for simulating the cigarette smoking action of a human body and detecting the features of the whole cigarette smoking process is developed to overcome the defects in the prior art, which is a problem to be solved urgently in the technical field of cigarette test.

SUMMARY

The present invention aims to solve the defects in the prior art and provides a smoking path simulation system based on a robotic arm, which may effectively simulate real smoking actions.

To achieve the above-mentioned object, the following technical solution is adopted in the present invention.

A smoking path simulation system based on a robotic arm includes a case, the robotic arm fixedly provided in the case and a cigarette holder mounted at a working end of the robotic arm, and further includes a feeding device, a cigarette tapping device and a cigarette lighting device provided in the case and located at a periphery of the robotic arm, as well as an image acquisition device mounted at the working end of the robotic arm;

the cigarette tapping device includes a cigarette tapping bracket located at the periphery of the robotic arm, a driving motor mounted at the cigarette tapping bracket, a pull rod provided at an output end of the driving motor, and a supporting plate mounted at the cigarette tapping bracket, configured to right a cigarette and provided with a groove;

the cigarette lighting device includes a cigarette lighting bracket located at the periphery of the robotic arm and a cigarette lighter mounted at the cigarette lighting bracket; and the image acquisition device includes a frame fixedly connected to the working end of the robotic arm and provided with N supporting rods, N cameras fixedly connected to different supporting rods respectively and having lenses facing the working end of the robotic arm, and N filling lights fixedly connected to different supporting rods respectively and having light source surfaces facing the working end of the robotic arm, with $N \geq 2$.

Further, preferably, the cigarette holder is configured as a tubular rubber sleeve.

Further, preferably, the groove is a V-shaped groove.

Further, preferably, the smoking path simulation system further includes a discharging device located at the periphery of the robotic arm; the discharging device includes a clamping jaw and a pneumatic cylinder mounted at the cigarette lighting bracket and configured to pull out the cigarette; and the pneumatic cylinder has a power output end connected to the clamping jaw and configured to drive the clamping jaw to clamp or release the cigarette.

Further, preferably, the smoking path simulation system further includes an ambient airflow detection device; and the ambient airflow detection device includes a connecting base mounted at the working end of the robotic arm and an airflow measuring sensor mounted at the connecting base and configured to acquire an airflow speed during movement of the cigarette at the working end of the robotic arm;

when the cigarette is tested, the cigarette holder is connected onto the working end of the robotic arm by the connecting base; and when airflow at the cigarette is measured, the connecting base is connected to the airflow measuring sensor.

Further, preferably, an airflow adjusting motor is mounted at a top end of the case, and the airflow adjusting motor is connected to the case through an airflow duct and controls airflow in the case.

Further, preferably, the feeding device includes a complete machine frame located at the periphery of the robotic arm, a hopper, a hopper driving motor, a cigarette steering mechanism and a guide tube, and the hopper, the hopper driving motor and the cigarette steering mechanism are mounted at the complete machine frame;

a through groove for a single cigarette in a horizontal state to pass through is provided at an upper portion of the hopper, and a mounting panel is mounted on a front side of the hopper;

the hopper driving motor is connected to the hopper and configured to drive the hopper to rotate, and under gravity, a single cigarette is obtained from cigarettes to be tested in the hopper through the through groove and falls into the cigarette steering mechanism;

the cigarette steering mechanism is provided under the hopper, has an open upper end, and is provided therein with a slope configured to convert an axis of the obtained cigarette from the horizontal direction to the vertical direction;

the slope in the cigarette steering mechanism has a lower end communicated with an inlet at a top end of the guide tube; and the guide tube is provided vertically.

Further, preferably, the camera has a view field parallel to an axis of the working end of the robotic arm; and a ray direction of the filling light is perpendicular to the axis of the working end of the robotic arm.

Further, preferably, the robotic arm carries the cigarette holder fixedly connected therewith to move from an initial position to a position under an outlet of the guide tube, such that an axis of the cigarette holder is superposed with an axis of the guide tube, the cigarette enters the cigarette holder through the guide tube, and after the cigarette holder clamps the cigarette, the robotic arm simulates spatial smoking actions of a consumer; and the axis of the cigarette holder and the working end of the robotic arm are kept consistent.

Further, preferably, N=3; that is, three cameras are provided, and three filling lights are provided symmetrically with the cigarette as a center. The filling light is adjacent to the camera to ensure that the cigarette is lighted uniformly. In the present invention, the plurality of groups of cameras are adopted to comprehensively acquire test images, thus greatly reducing test data errors caused by single-side image acquisition, and meanwhile increasing effective test data and improving test efficiency.

After the cigarette holder clamps the cigarette, the robotic arm carries the cigarette to move to a cigarette lighting position, and the cigarette lighter lights the cigarette carried by the robotic arm; then, the robotic arm simulates a smoking path of the consumer, and when the cigarette is required to be tapped, the robotic arm moves from a smoking position to a tapping position, the driving motor drives the pull rod to tap the cigarette on the cigarette holder, the robotic arm moves from the tapping position to a righting position, and the cigarette on the cigarette holder is righted through the groove of the supporting plate; next, the simulation of the smoking path of the consumer, the cigarette tapping action and the righting action are repeated until a smoking process is finished (or the test is finished); and then, the robotic arm moves to a discharging position, the pneumatic cylinder drives the clamping jaw to clamp the cigarette carried by the robotic arm, the robotic arm moves in a direction opposite to the direction of the clamping jaw, and after the cigarette is separated from the robotic arm, the pneumatic cylinder drives the clamping jaw to release the cigarette to finish discharge. The robotic arm simulates arm swing and wrist overturning actions of the consumer holding the cigarette in space when moving from the smoking position to the tapping position.

Preferably, the airflow in the case has a speed that is controlled between 150 mm/s and 250 mm/s.

Compared with the prior art, the present invention has the following beneficial effects.

1. A complete smoking path simulation system is provided, which simulates actions of a cigarette smoking process of a human body, including all typical actions of cigarette lighting, smoking, multi-angle static cigarette holding, wrist overturning, cigarette ash flicking, or the like.

2. The cigarette smoking actions of the human body are simulated under different simulated environmental conditions, performance indexes of states in a cigarette combustion process are tested, including a cigarette ash integration performance, carbon line quality, a multi-angle ash holding rate, or the like, objectivity and accuracy of a test result are improved, and the test result is more accurate and reliable, and may effectively guide cigarette research and development work to optimize a product quality upgrade.

3. In the present invention, functional units, such as the robotic arm, the feeding device, the cigarette tapping device, the lighting device, the discharging device, an environment simulation device, a smoking device, the image acquisition device, or the like, are systematically integrated to realize full-automatic continuous test under the condition of simulating the cigarette smoking action path of the human body, thus having good repeatability, guaranteeing consistency of simulated action paths, and effectively improving test precision of the cigarette combustion characteristic indexes.

4. The present invention realizes full-vision real-time acquisition of the images in the cigarette combustion process, avoids the lack of the objectivity and accuracy of the test result due to single-side photographing image acquisition, greatly improves the accuracy of the test result, and provides accurate data support for guiding the technology research and development and production optimization of a product; and Table 1 and FIG. 9 are illustrations of improvement in the test indexes.

As may be seen from the data in Table 1, during the test of an ash cracking index (the area of a cracked part of an ash column/the whole area of the ash column×100%) of the same parallel sample by single-side shooting test equipment, an SD value is large, test values also show large fluctuation, and the test result of the sample is difficult to accurately judge. During three-side full-vision test, the SD value may show well test stability, and meanwhile, the objectivity and precision of the test result are better due to full-vision image acquisition.

TABLE 1 test values of cigarette ash cracking index of various parallel samples by different test methods

| | Sample | | | | | Mean | |
|---|---|---|---|---|---|---|---|
| | 1 | 2 | 3 | 4 | 5 | value | SD |
| Single-side shooting static test | | | | | | | |
| Test value | 4.25 | 5.72 | 11.86 | 12.84 | 5.88 | 8.11 | 3.94 |
| Full-vision static test | | | | | | | |
| Shooting angle | | | | | | | |
| Angle 1# | 4.41 | 3.95 | 3.89 | 2.78 | 4.68 | 3.94 | 0.73 |
| Angle 2# | 2.37 | 2.24 | 1.68 | 0.87 | 2.67 | 1.97 | 0.71 |
| Angle 3# | 2.56 | 3.41 | 3.46 | 2.67 | 2.08 | 2.84 | 0.59 |
| Mean value at various angles | 3.11 | 3.20 | 3.01 | 2.11 | 3.14 | 2.91 | 0.45 |

As may be seen from the data test result and the corresponding collected images in FIG. 9, if a single-side shooting process is adopted, the deviation degree of the cigarette ash column is difficult to accurately detect and evaluate due to limited shooting angles.

5. The deviation degree of the ash column is more objectively tested by the system according to the present invention, deviation of the ash column represents the degree to which the ash column deviates from an axis of a cigarette filter stick in the cigarette combustion process, and if single image acquisition is performed from other visual angle planes, the deviation degree of the cigarette-combustion ash column may be wrongly measured due to visual problems, and is unable to correctly represent the degree to which the whole cigarette-combustion ash column deviates from the axis of the cigarette filter stick, as shown in FIG. 10 (3 cameras are adopted for shooting). In the present invention, the above-mentioned problem is effectively solved with a method of limiting relative position visual angles of the camera and the cigarette to perform visual acquisition.

6. Currently, no unified and systematic testing method is available for investigating an ash holding performance in the cigarette industry, and the common method includes lighting and then placing a cigarette horizontally, and observing an ash holding length of a cigarette-combustion ash column under a smoking-free condition. The above-mentioned method has no smoking condition and is based on a static horizontal test, but when a consumer practically holds the cigarette statically, the cigarette is naturally tilted upwards by a certain angle in order to avoid smoking fingers. Therefore, the common static test method is unable to simulate smoking actions of the consumer. The system according to the present invention may realize the dynamic test of the ash holding performance, and improves the objectivity and precision of test and evaluation of the ash holding performance, so as to better guide the development and research work of the cigarette product.

BRIEF DESCRIPTION OF THE DRAWINGS

In order to more clearly explain the technical solutions of the embodiments of the present invention or the prior art, the drawings to be used in the descriptions of the embodiments or the prior art are briefly introduced as follows. Apparently, the following drawings merely illustrate some embodiments of the present invention, and a person skilled in the art can obtain other drawings from these drawings without any creative effort.

Figure 1:
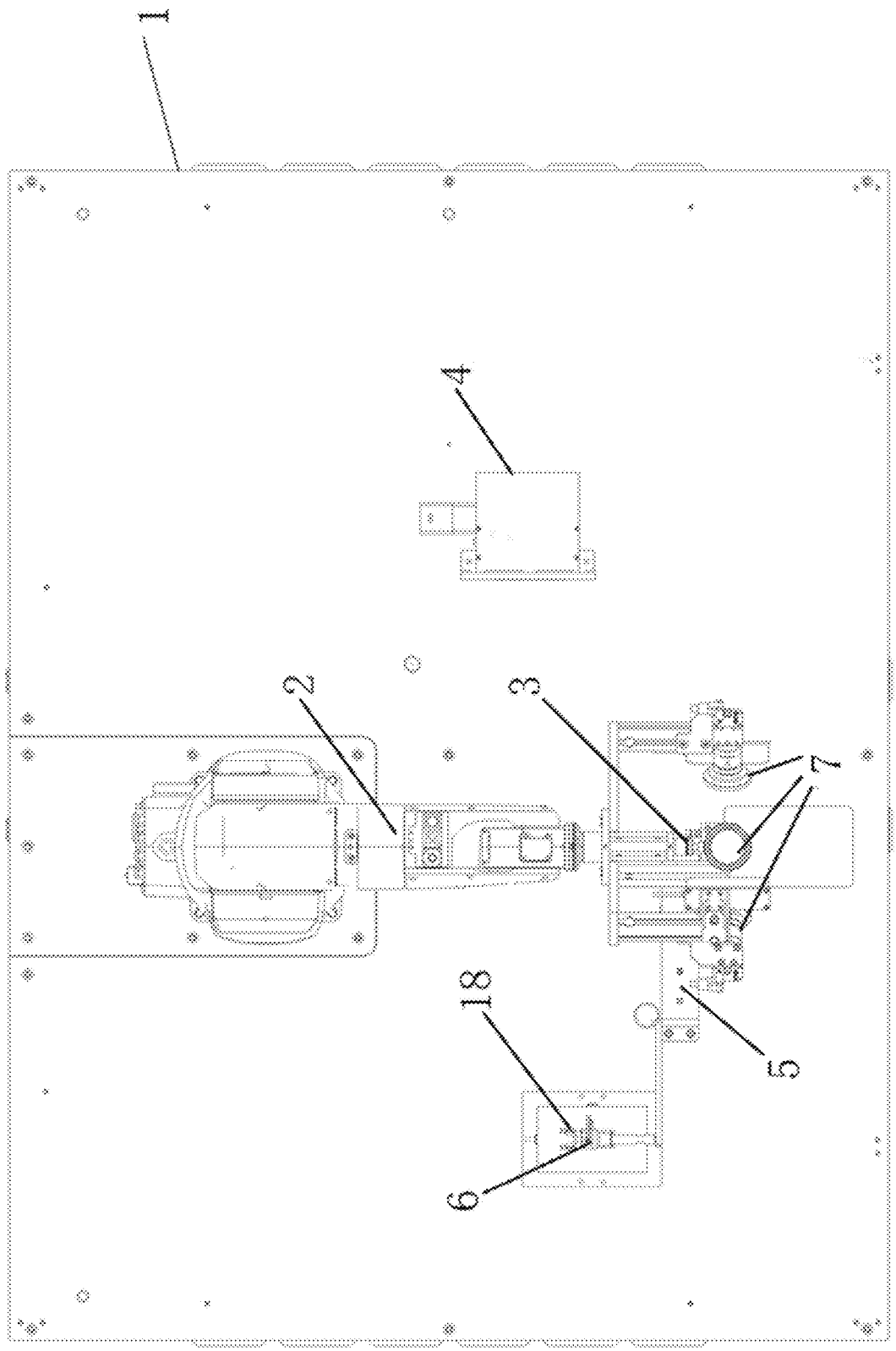
FIG. 1 is a schematic top structural diagram of a smoking path simulation system based on a robotic arm according to the present invention.
Figure 10:
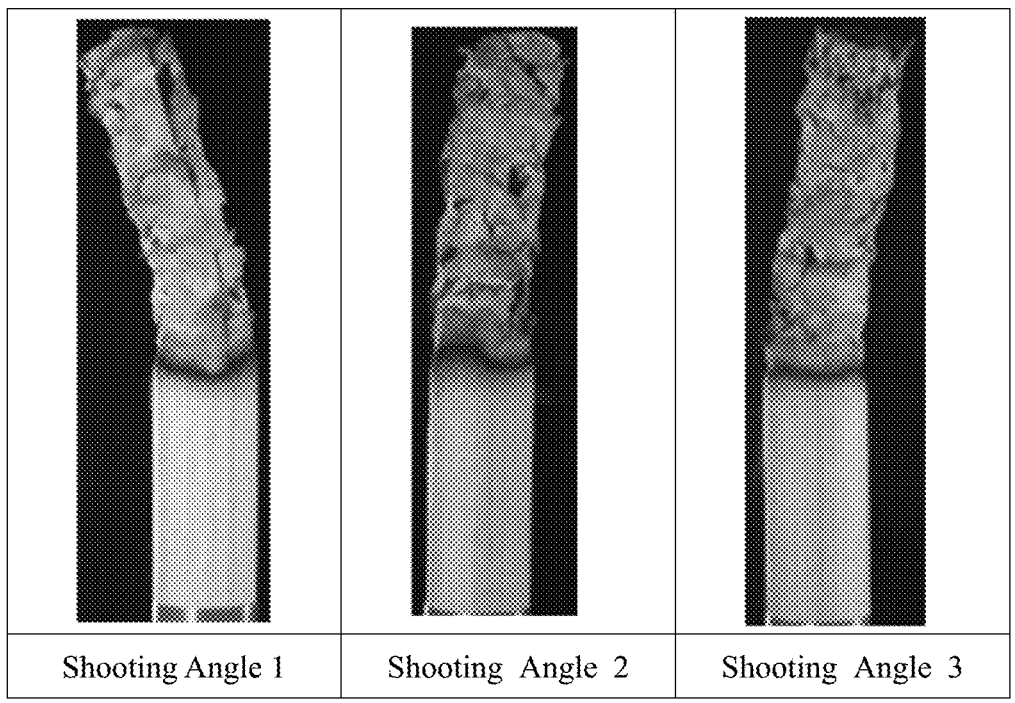

in the drawing, 1. case; 2. robotic arm; 3. cigarette holder; 4. feeding device; 5. cigarette tapping device; 6. cigarette lighting device; 7. image acquisition device; 8. cigarette tapping bracket; 9. driving motor; 10. pull rod; 11. supporting plate; 12. cigarette lighting bracket; 13. cigarette lighter; 14. supporting rod; 15. frame; 16. camera; 17. filling light; 18. discharging device; 19. clamping jaw; 20. pneumatic cylinder; 21. cigarette; 22. ambient airflow detection device; 23. connecting base; 24. airflow measuring sensor; 25. airflow adjusting motor; 26. airflow duct; 27. mounting panel; 28. hopper; 29. hopper driving motor; 30. cigarette steering mechanism; 31. guide tube; 32. complete machine frame;

FIG. 9 is a test diagram of cigarette-combustion ash cracking indexes of various parallel samples; and FIG. 10 is pictures taken by 3 cameras of the same cigarette to be tested in the process of measuring the deviation degree of a cigarette-combustion ash column by movement.

DETAILED DESCRIPTION OF THE EMBODIMENTS

The present invention will be further described below in detail in conjunction with embodiments.

It will be appreciated by those skilled in the art that the following embodiments are illustrative of the present invention only and should not be taken as limiting the scope of the present invention. The contents in the embodiments, in which specific technologies or conditions are not specified, are performed according to technologies or conditions described in documents in the art or according to the product specification. All adopted materials or equipment without indicated manufacturers may be conventional products available by purchase.

Those skilled in the art may understand that, unless specifically stated otherwise, the singular forms "a", "an", "said" and "the" used herein may also include plural forms. It should be further understood that the terms "includes", "including", "comprises" and/or "comprising,", when used in this specification, specify the presence of stated features, integers, steps, operations, elements, and/or components, but do not preclude the presence or addition of one or more other features, integers, steps, operations, elements, components, and/or groups thereof. It should be understood that when an element is referred to as being "connected" to another element, it can be directly connected to the other element or intervening elements may also be present.

In the description of the present invention, "a plurality of" means two or more unless otherwise stated. Terms such as "inner", "upper" and "lower" refer to the orientation or state relationship as shown in the drawings, and are only for convenience of description and simplification of the description of the present invention, rather than indicating or implying that the device or element must have a specific orientation and be constructed or operated in a particular orientation, thus cannot be construed to limit the present invention.

In the description of the present invention, it should be noted that unless specified or limited otherwise, the terms "mounted", "connected", and "provided" and the like are used broadly, and may be, for example, fixed connections, detachable connections, or integral connections; may also be mechanical connections or electrical connections; may also be direct connections or indirect connections via intervening structures. The above terms may be understood by those skilled in the art according to specific situations.

It may be understood by those skilled in the art that, unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the prior art and will not be interpreted in an idealized or overly formal sense unless expressly so defined herein.

First Embodiment

As shown in FIGS. 1 to 4, a smoking path simulation system based on a robotic arm includes a case 1, the robotic arm 2 fixedly provided in the case 1 and a cigarette holder 3 mounted at a working end of the robotic arm 2, and further includes a feeding device 4, a cigarette tapping device 5 and a cigarette lighting device 6 provided in the case 1 and located at a periphery of the robotic arm 2, as well as an image acquisition device 7 mounted at the working end of the robotic arm; preferably, the cigarette holder 3 is configured as a tubular rubber sleeve; and the cigarette tapping device 5 includes a cigarette tapping bracket 8 located at the periphery of the robotic arm, a driving motor 9 mounted at the cigarette tapping bracket 8, a pull rod 10 provided at an output end of the driving motor 9, and a supporting plate 11 mounted at the cigarette tapping bracket 8, configured to right a cigarette and provided with a groove; and preferably, the groove is a V-shaped groove.

The cigarette lighting device 6 includes a cigarette lighting bracket 12 located at the periphery of the robotic arm 2 and a cigarette lighter 13 mounted at the cigarette lighting bracket 12; the specific structure of the cigarette lighter 13 is not limited in the present invention, and existing equipment may be adopted as the cigarette lighter 13; and the image acquisition device 7 includes a frame 15 fixedly connected to the working end of the robotic arm 2 and provided with N supporting rods 14, N cameras 16 fixedly connected to different supporting rods 14 respectively and having lenses facing the working end of the robotic arm 2, and N filling lights 17 fixedly connected to different supporting rods 14 respectively and having light source surfaces facing the working end of the robotic arm 2, with N≥2. Preferably, N=3.

Second Embodiment

As shown in FIGS. 1 to 4, a smoking path simulation system based on a robotic arm includes a case 1, the robotic arm 2 fixedly provided in the case 1 and a cigarette holder 3 mounted at a working end of the robotic arm 2, and further includes a feeding device 4, a cigarette tapping device 5 and a cigarette lighting device 6 provided in the case 1 and located at a periphery of the robotic arm 2, as well as an image acquisition device 7 mounted at the working end of the robotic arm; preferably, the cigarette holder 3 is configured as a tubular rubber sleeve; and the cigarette tapping device 5 includes a cigarette tapping bracket 8 located at the periphery of the robotic arm, a driving motor 9 mounted at the cigarette tapping bracket 8, a pull rod 10 provided at an output end of the driving motor 9, and a supporting plate 11 mounted at the cigarette tapping bracket 8, configured to right a cigarette and provided with a groove; and preferably, the groove is a V-shaped groove.

The cigarette lighting device 6 includes a cigarette lighting bracket 12 located at the periphery of the robotic arm 2 and a cigarette lighter 13 mounted at the cigarette lighting bracket 12; the specific structure of the cigarette lighter 13 is not limited in the present invention, and existing equipment may be adopted as the cigarette lighter 13; and the image acquisition device 7 includes a frame 15 fixedly connected to the working end of the robotic arm 2 and provided with N supporting rods 14, N cameras 16 fixedly connected to different supporting rods 14 respectively and having lenses facing the working end of the robotic arm 2, and N filling lights 17 fixedly connected to different supporting rods 14 respectively and having light source surfaces facing the working end of the robotic arm 2, with N≥2. Preferably, N=3.

The smoking path simulation system further includes a discharging device 18 located at the periphery of the robotic arm; the discharging device 18 includes a clamping jaw 19 and a pneumatic cylinder 20 mounted at the cigarette lighting bracket 12 and configured to pull out the cigarette; and the pneumatic cylinder 20 has a power output end connected to the clamping jaw 19 and configured to drive the clamping jaw 19 to clamp or release the cigarette 21.

Third Embodiment

As shown in FIGS. 1 to 6, a smoking path simulation system based on a robotic arm includes a case 1, the robotic arm 2 fixedly provided in the case 1 and a cigarette holder 3 mounted at a working end of the robotic arm 2, and further includes a feeding device 4, a cigarette tapping device 5 and a cigarette lighting device 6 provided in the case 1 and located at a periphery of the robotic arm 2, as well as an image acquisition device 7 mounted at the working end of the robotic arm; preferably, the cigarette holder 3 is configured as a tubular rubber sleeve; and the cigarette tapping device 5 includes a cigarette tapping bracket 8 located at the periphery of the robotic arm, a driving motor 9 mounted at the cigarette tapping bracket 8, a pull rod 10 provided at an output end of the driving motor 9, and a supporting plate 11 mounted at the cigarette tapping bracket 8, configured to right a cigarette and provided with a groove; and preferably, the groove is a V-shaped groove.

The cigarette lighting device 6 includes a cigarette lighting bracket 12 located at the periphery of the robotic arm 2 and a cigarette lighter 13 mounted at the cigarette lighting bracket 12; the specific structure of the cigarette lighter 13 is not limited in the present invention, and existing equipment may be adopted as the cigarette lighter 13; and the image acquisition device 7 includes a frame 15 fixedly connected to the working end of the robotic arm 2 and provided with N supporting rods 14, N cameras 16 fixedly connected to different supporting rods 14 respectively and having lenses facing the working end of the robotic arm 2, and N filling lights 17 fixedly connected to different supporting rods 14 respectively and having light source surfaces facing the working end of the robotic arm 2, with N≥2. Preferably, N=3.

The smoking path simulation system further includes a discharging device 18 located at the periphery of the robotic arm; the discharging device 18 includes a clamping jaw 19 and a pneumatic cylinder 20 mounted at the cigarette lighting bracket 12 and configured to pull out the cigarette; and the pneumatic cylinder 20 has a power output end connected to the clamping jaw 19 and configured to drive the clamping jaw 19 to clamp or release the cigarette 21.

The smoking path simulation system further includes an ambient airflow detection device 22; and the ambient airflow detection device 22 includes a connecting base 23 mounted at the working end of the robotic arm and an airflow measuring sensor 24 mounted at the connecting base 23 and configured to acquire an airflow speed during movement of the cigarette at the working end of the robotic arm 2;

when the cigarette is tested, the connecting base 23 is connected to the cigarette holder 3; that is, the cigarette holder 3 is connected onto the working end of the robotic arm 2 by the connecting base; and when airflow at the cigarette is measured, the connecting base 23 is connected to the airflow measuring sensor 24.

Preferably, an airflow adjusting motor 25 is mounted at a top end of the case 1, and the airflow adjusting motor 25 is connected to the case 1 through an airflow duct 26 and controls airflow in the case 1.

Fourth Embodiment

As shown in FIGS. 1 to 8, a smoking path simulation system based on a robotic arm includes a case 1, the robotic arm 2 fixedly provided in the case 1 and a cigarette holder 3 mounted at a working end of the robotic arm 2, and further includes a feeding device 4, a cigarette tapping device 5 and a cigarette lighting device 6 provided in the case 1 and located at a periphery of the robotic arm 2, as well as an image acquisition device 7 mounted at the working end of the robotic arm; preferably, the cigarette holder 3 is configured as a tubular rubber sleeve; and the cigarette tapping device 5 includes a cigarette tapping bracket 8 located at the periphery of the robotic arm, a driving motor 9 mounted at the cigarette tapping bracket 8, a pull rod 10 provided at an output end of the driving motor 9, and a supporting plate 11 mounted at the cigarette tapping bracket 8, configured to right a cigarette and provided with a groove; and preferably, the groove is a V-shaped groove.

The cigarette lighting device 6 includes a cigarette lighting bracket 12 located at the periphery of the robotic arm 2 and a cigarette lighter 13 mounted at the cigarette lighting bracket 12; the specific structure of the cigarette lighter 13 is not limited in the present invention, and existing equipment may be adopted as the cigarette lighter 13; and the image acquisition device 7 includes a frame 15 fixedly connected to the working end of the robotic arm 2 and provided with N supporting rods 14, N cameras 16 fixedly connected to different supporting rods 14 respectively and having lenses facing the working end of the robotic arm 2, and N filling lights 17 fixedly connected to different supporting rods 14 respectively and having light source surfaces facing the working end of the robotic arm 2, with N≥2. Preferably, N=3.

The smoking path simulation system further includes a discharging device 18 located at the periphery of the robotic arm; the discharging device 18 includes a clamping jaw 19 and a pneumatic cylinder 20 mounted at the cigarette lighting bracket 12 and configured to pull out the cigarette; and the pneumatic cylinder 20 has a power output end connected to the clamping jaw 19 and configured to drive the clamping jaw 19 to clamp or release the cigarette 21.

The smoking path simulation system further includes an ambient airflow detection device 22; and the ambient airflow detection device 22 includes a connecting base 23 mounted at the working end of the robotic arm and an airflow measuring sensor 24 mounted at the connecting base 23 and configured to acquire an airflow speed during movement of the cigarette at the working end of the robotic arm 2;

when the cigarette is tested, the connecting base 23 is connected to the cigarette holder 3; that is, the cigarette holder 3 is connected onto the working end of the robotic arm 2 by the connecting base; and when airflow at the cigarette is measured, the connecting base 23 is connected to the airflow measuring sensor 24.

Preferably, an airflow adjusting motor 25 is mounted at a top end of the case 1, and the airflow adjusting motor 25 is connected to the case 1 through an airflow duct 26 and controls airflow in the case 1.

The feeding device 4 includes a complete machine frame 32 located at the periphery of the robotic arm 2, a hopper 28, a hopper driving motor 29, a cigarette steering mechanism 30 and a guide tube 31, and the hopper, the hopper driving motor and the cigarette steering mechanism are mounted at the complete machine frame 32;

a through groove for a single cigarette in a horizontal state to pass through is provided at an upper portion of the hopper 28, and a mounting panel 27 is mounted on a front side of the hopper;

the hopper driving motor 29 is connected to the hopper 28 and configured to drive the hopper 28 to rotate, and under gravity, a single cigarette is obtained from cigarettes to be tested in the hopper 28 through the through groove and falls into the cigarette steering mechanism 30;

the cigarette steering mechanism 30 is provided under the hopper 28, has an open upper end, and is provided therein with a slope configured to convert an axis of the obtained cigarette 21 from the horizontal direction to the vertical direction;

the slope in the cigarette steering mechanism 30 has a lower end communicated with an inlet at a top end of the guide tube 31; and the guide tube 31 is provided vertically. The guide tube 31 is configured to guide the cigarette 21 to be tested to the cigarette holder 3 which is fitted with and fixed by the robotic arm 2.

The mounting panel 27 is detachably or movably connected to the hopper 28, and connected to the complete machine frame 32, the cigarettes to be tested are loaded into the hopper 28 from an opening of the mounting panel 27, and the mounting panel 27 may prevent the cigarettes 21 to be tested from overflowing the hopper 28; and the specific mounting position of the complete machine frame 32 is not particularly limited in the present invention, and the complete machine frame is preferably fixed at an inner wall of the case 1.

Preferably, the camera 16 has a view field parallel to an axis of the working end of the robotic arm 2; and a ray direction of the filling light 17 is perpendicular to the axis of the working end of the robotic arm 2.

Preferably, the airflow in the case 1 has a speed that is controlled between 150 mm/s and 250 mm/s.

The cigarette lighter 13 is configured as a power device for lighting the cigarette 21;

the cigarette holder 3 is configured to hold the cigarette 21;

the cigarette lighting bracket 12 is configured to fix the cigarette lighter 13, the clamping jaw 19 and the pneumatic cylinder 20;

the clamping jaw 19 is configured to clamp and release the smoked cigarette 21 (cigarette butt); and the pneumatic cylinder 20 is configured to drive the clamping jaw 19 to clamp and release the smoked cigarette 21 (cigarette butt).

The pull rod 10 is configured to simulate an action of flicking cigarette ash with the fingers of a consumer;

the cigarette tapping bracket 8 is configured to fix and mount the pull rod 10 and the driving motor 9; preferably, the cigarette tapping bracket 8 is configured as an inverted L-shaped bracket;

the driving motor 9 is configured to drive the pull rod 10, and may simulate the process of flicking the cigarette ash by the consumer, including the strength of flicking the cigarette ash, the number of flicks of the cigarette ash, or the like; and the supporting plate 11 is configured to cooperate with downward movement of the mechanical arm 2 to complete the cigarette righting function after the cigarette ash is flicked.

The robotic arm 2 then moves from the tapping position to the righting position, which is generally downward movement (with less downward displacement).

The airflow adjusting motor 25 is configured to adjust the airflow in the case 1 as required.

The airflow measuring sensor 24 is mounted at the connecting base 23, and performs real-time dynamic measurement according to the movement of the robotic arm 2 in the case 1.

The mounting panel 27 is detachably or movably connected to the hopper 28, and after the mounting panel 27 is detached or opened, the cigarettes to be tested are loaded into the hopper 28, and then, the mounting panel 27 is mounted or closed.

Preferably, the robotic arm 2 carries the cigarette holder 3 fixedly connected therewith to move from an initial position to a position under an outlet of the guide tube 31, such that an axis of the cigarette holder 3 is superposed with an axis of the guide tube 31, the cigarette 21 enters the cigarette holder 3 through the guide tube 31, and after the cigarette holder 3 clamps the cigarette 21, the robotic arm 2 simulates spatial smoking actions of the consumer; and the axis of the cigarette holder 3 and the working end of the robotic arm 2 are kept consistent.

After the device according to the present invention is powered on, the robotic arm 2, the driving motor 9, the cigarette lighter 13, the camera 16, the filling light 17, the pneumatic cylinder 20, the airflow adjusting motor 25 and the hopper driving motor 29 are in an activated enabling state.

After the cigarette holder 3 clamps the cigarette, the robotic arm 2 carries the cigarette 21 to move to a cigarette lighting position, and the cigarette lighter 13 lights the cigarette 21 carried by the robotic arm 2; then, the robotic arm 2 simulates a smoking path of the consumer, and when the cigarette is required to be tapped, the robotic arm 2 moves from a smoking position to the tapping position, the driving motor 9 drives the pull rod 10 to tap the cigarette 21 on the cigarette holder 3, the robotic arm 2 moves from the tapping position to the righting position, and the cigarette 21 on the cigarette holder 3 is righted through the groove of the supporting plate 11; next, the simulation of the smoking path of the consumer, the cigarette tapping action and the righting action are repeated until a smoking process is finished (or the test is finished); and then, the robotic arm 2 moves to a discharging position, the pneumatic cylinder 20 drives the clamping jaw 19 to clamp the cigarette 21 carried by the robotic arm 2, the robotic arm 2 moves in a direction opposite to the direction of the clamping jaw 19, and after the cigarette 21 is separated from the robotic arm 2, the pneumatic cylinder 20 drives the clamping jaw 19 to release the cigarette 21 to finish discharge. The robotic arm 2 simulates arm swing and wrist overturning actions of the consumer holding the cigarette in space when moving from the smoking position to the tapping position.

The simulation movement smoking path of the robotic arm 2 is planned in a preset program, and the frame 15 on which the supporting rod 14 carrying the camera 16 and the filling light 17 is located is fixedly connected to the robotic arm 2 and moves along with the movement of the robotic arm 2 in the smoking path of the space. Under the driving of the preset program of the robotic arm 1, the filling light 17 is turned on, and the camera 16 starts to work. During real-time movement of the robotic arm 2, the camera 16 may acquire effective images in an area where the filling lights 17 are uniformly distributed in real time at any time according to demands, the corresponding images may be analyzed and processed after acquisition (it should be noted that the analysis and processing operations of the images do not belong to the working content of components in the present invention), and when the whole device finishes working, the robotic arm 2 returns to the initial position and stops moving, the light supplement lamps 17 are turned off, and the camera 16 stops acquiring images.

The righting action is specifically conducted as follows: the cigarette 21 held by the cigarette holder 3 continues to move to a notch of the V-shaped groove structure under the action of the preset program of the robotic arm 2. The position of the cigarette 21 at this point is a space coordinate position determined by the relative position of the V-shaped groove when the cigarette 21 is not tapped in the earlier stage and is located at the center of the cigarette holder 3, and the tapped cigarette 21 is righted under the combined action of the cigarette holder 3 and the V-shaped groove controlled by the robotic arm 2. The robotic arm 2 carries the cigarette 21 held by the cigarette holder 3, and returns to the tapping position from the righting position, and the righting action is finished.

Figure 2:
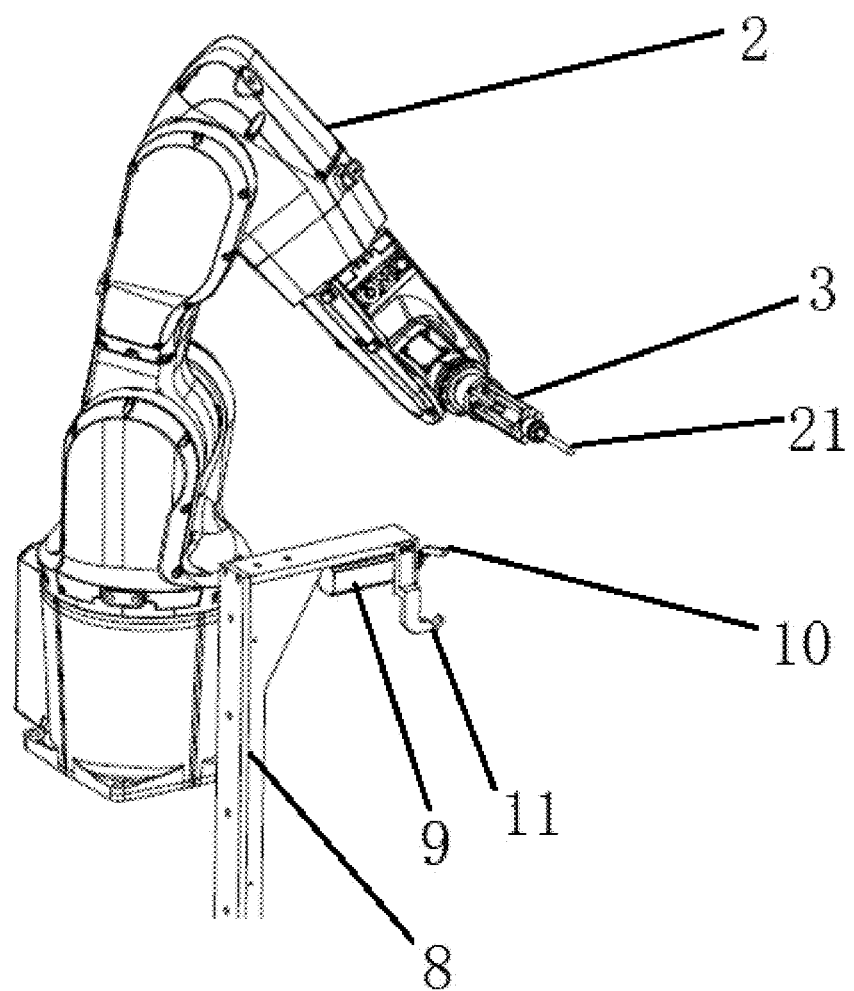
FIG. 2 is a schematic structural diagram of a cigarette tapping device.
Figure 3:
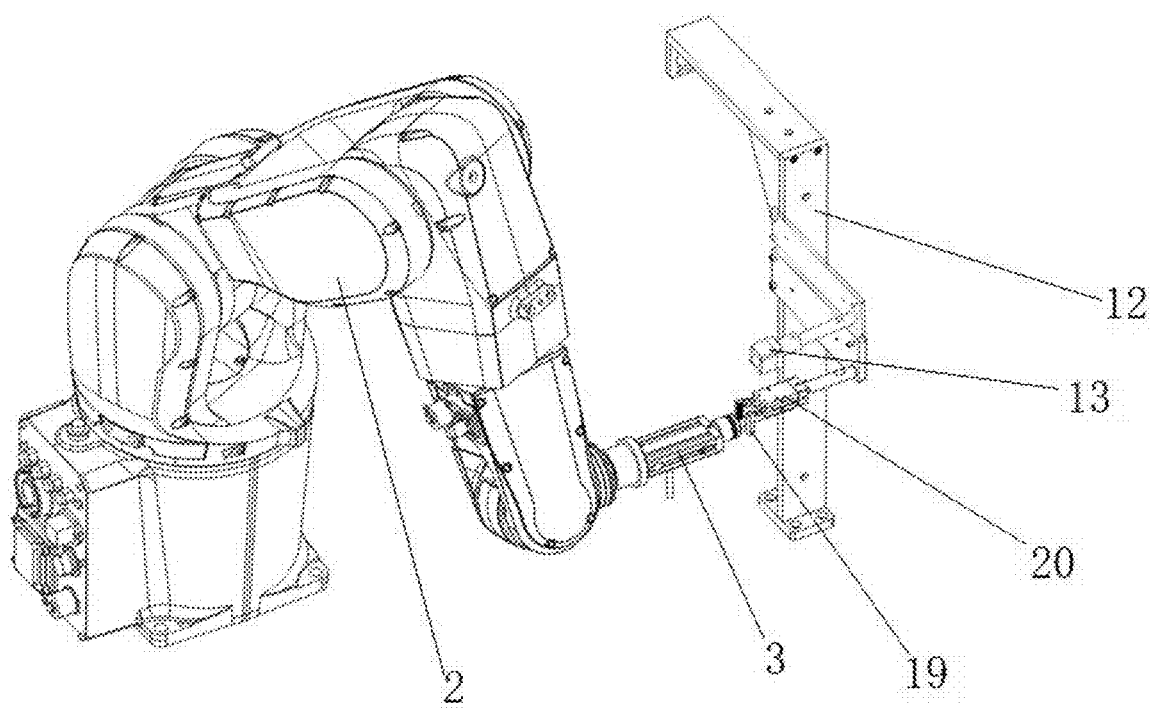
FIG. 3 is a schematic structural diagram of a cigarette lighting device and a discharging device.
Figure 4:
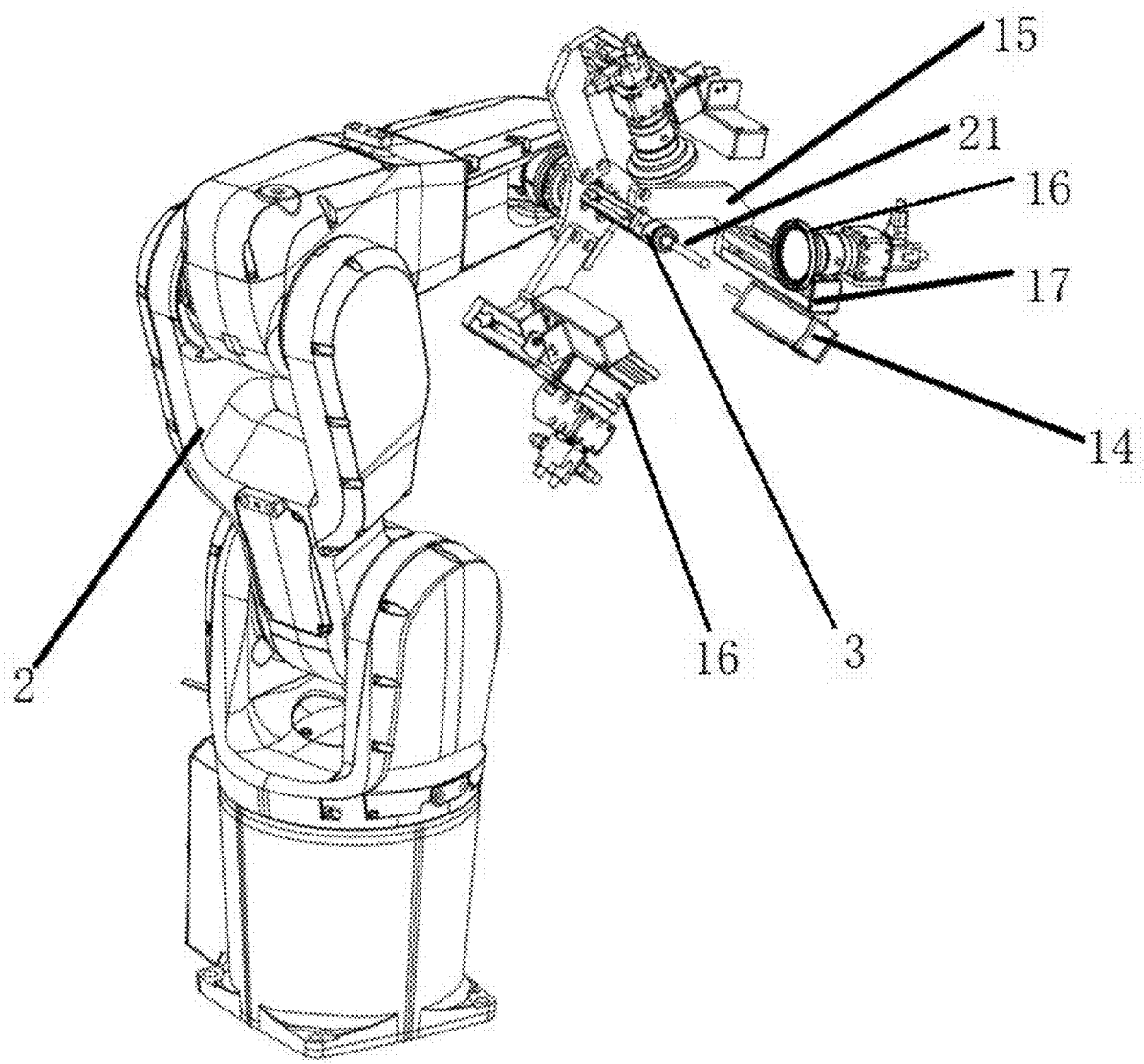
FIG. 4 is a schematic structural diagram of an image acquisition device.
Figure 5:
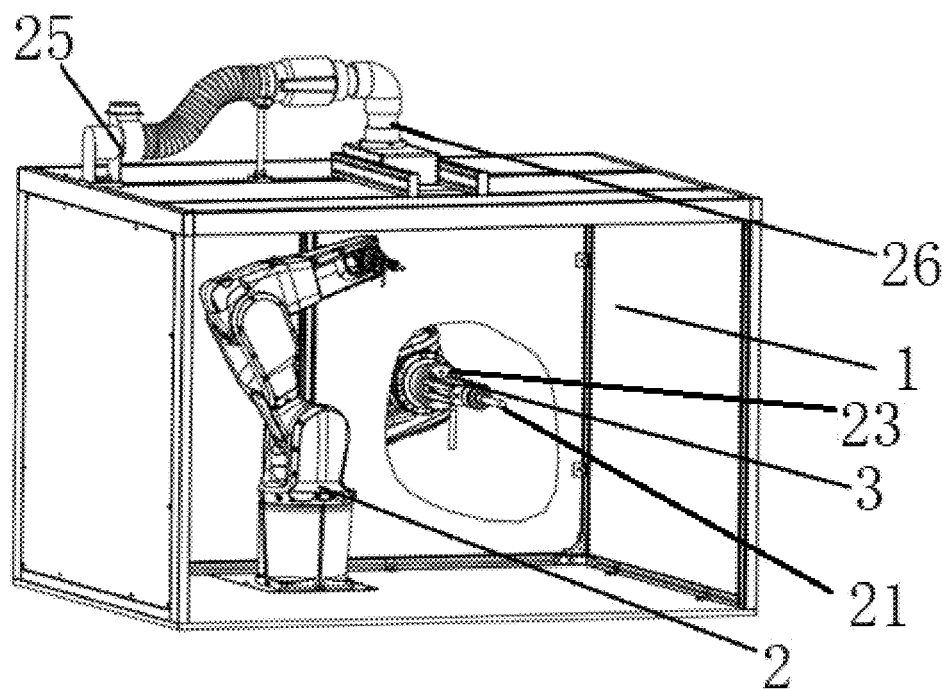
FIG. 5 is a schematic structural diagram of an ambient airflow detection device.
Figure 6:
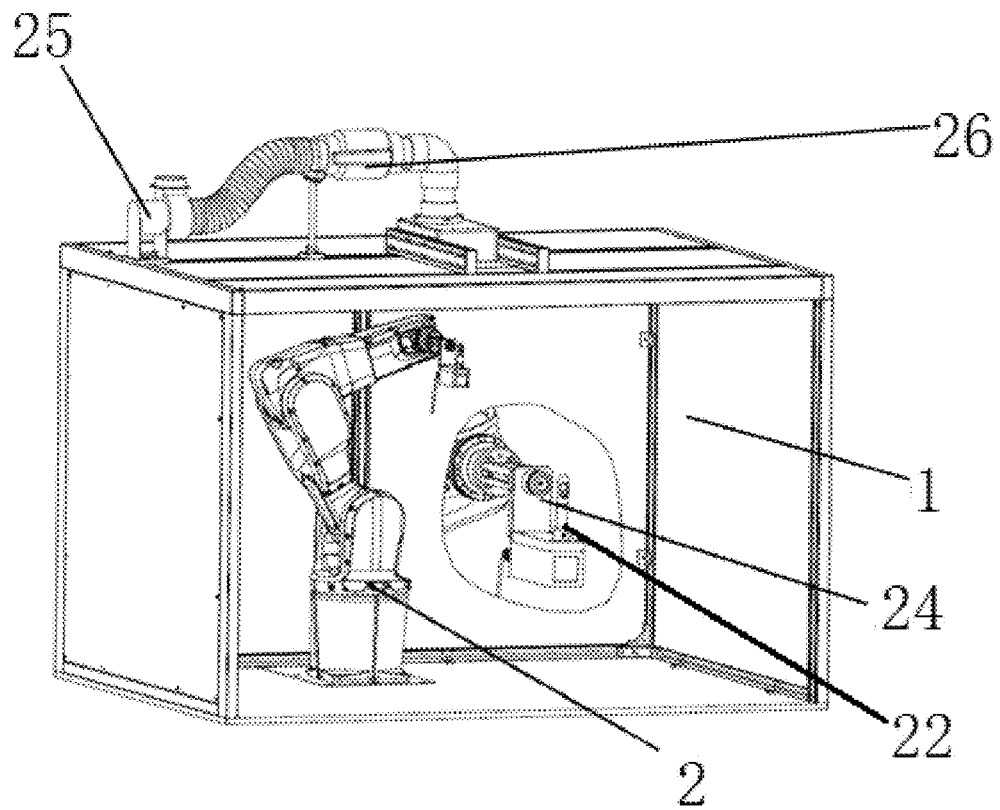
FIG. 6 is a schematic structural diagram of air flow measurement.
Figure 7:
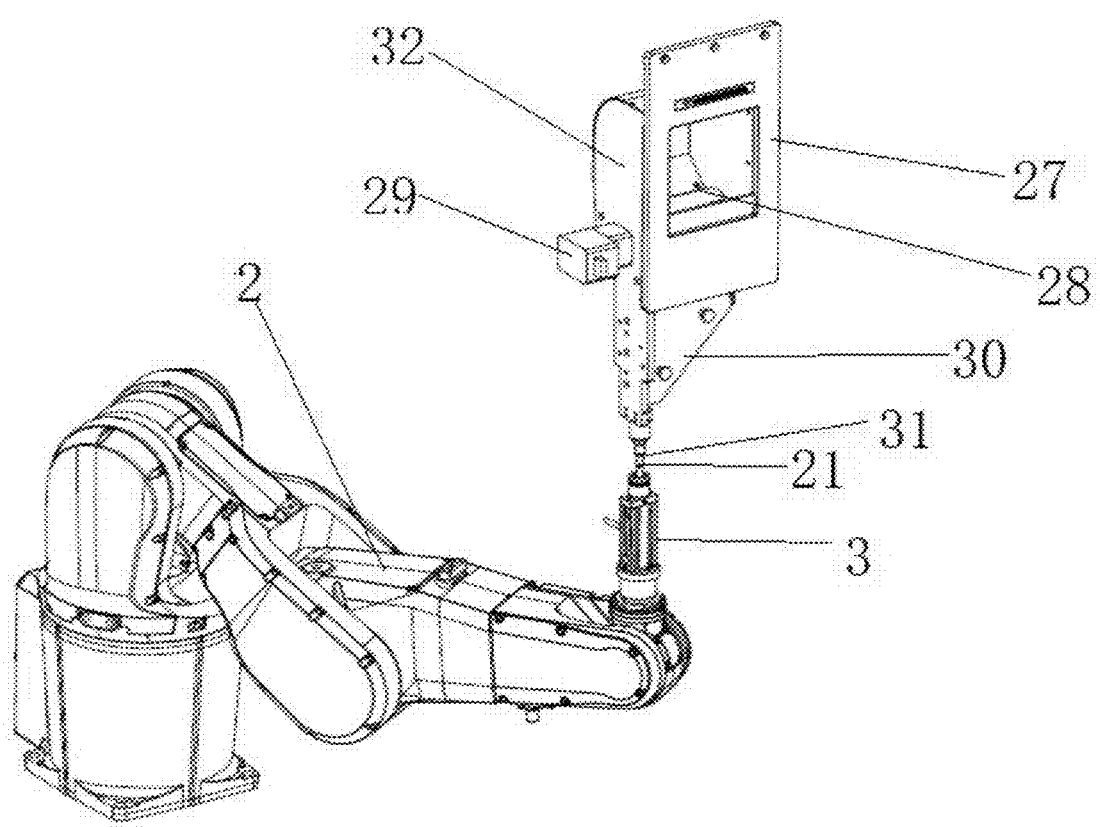
FIG. 7 is a schematic structural diagram of a feeding device.
Figure 8:
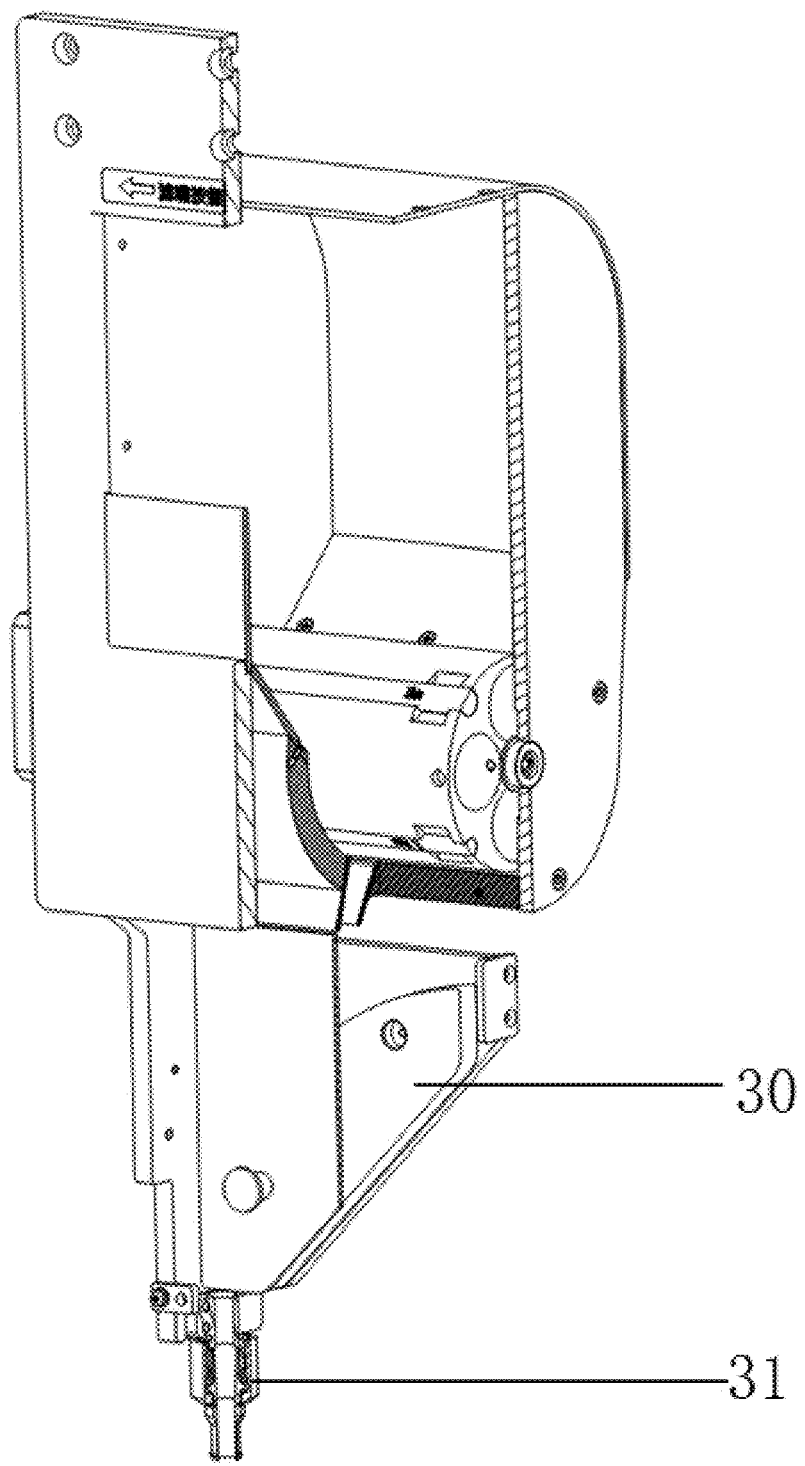
FIG. 8 is a partial sectional view of the feeding device.

The feeding action is specifically conducted as follows: the robotic arm 2 carries the cigarette holder 3 fixedly connected therewith and moves from the initial position to a position ready for taking and feeding the cigarettes, i.e., a position under the guide tube 31 cooperating with the hopper 28. Then, the robotic arm 2 controls the cigarette holder 3 to move to a position where the axis of the cigarette holder 3 is superposed with the axis of the guide tube 31. In the case where the two axis are always located on the same straight line, the robotic arm 2 is controlled to move upwards, such that space positions of the cigarette holder 3 and the guide tube 31 are superposed; in the superposition process, the outlet of the guide tube 31 enters a sealing ring inside the cigarette holder 3 to form a negative distance between the cigarette holder 3 and the guide tube 31, such that the cigarette to be tested is guaranteed to enter the cigarette holder 3 from the outlet of the guide tube 31 and is tightly surrounded by the sealing ring of the cigarette holder, as shown in FIG. 2; the hopper driving motor 29 drives the hopper 28 to rotate and obtain a single cigarette from the cigarettes to be tested in the hopper 28 (a single cigarette is obtained through the through groove of the hopper which only contains one cigarette); the obtained cigarette 21 falls to the cigarette steering mechanism 30 under gravity, and slides downwards on the slope of the cigarette steering mechanism 30 under gravity, such that the cigarette 21 is converted from the horizontal direction to the vertical direction; and the cigarette 21 enters the cigarette holder 3 by the guide tube 31, and after the cigarette holder 3 clamps the cigarette 21, the robotic arm 2 moves vertically downwards until the cigarette clamped by the cigarette holder 3 is completely separated from the guide tube 31, and finally, the cigarette feeding action is finished.

The ambient airflow detection is specifically conducted as follows: the connecting base 23 at an upper clamping end of the robotic arm 2 is connected to the airflow measuring sensor 24, and the robotic arm 2 carries the airflow measuring sensor 24 to move to a position for measurement. By adjusting the rotating speed of the airflow adjusting motor 25 in the preset program and measuring the airflow with the airflow measuring sensor 24, the speed of the airflow is between 150 mm/s and 250 mm/s, and the rotating speed R of the airflow adjusting motor 25 is recorded. The rotating speed R of the airflow adjusting motor 25 is taken as a calibration value for measurement. That is, the airflow speed corresponding to the known rotating speed of the airflow adjusting motor 25 is used as the calibration value, and then, at the rotating speed of the motor, the airflow value measured by the airflow measuring sensor 24 is calibrated according to the calibration value, and if the airflow value actually measured by the airflow measuring sensor 24 is not within this range, recalibration is necessary. During the ambient airflow detection, the robotic arm 2 carries the airflow measuring sensor 24 to move to the test position. The rotating speed of the airflow adjusting motor 25 is set to the calibration value R, thus ensuring that the speed of the airflow is between 150 mm/s and 250 mm/s.

The foregoing shows and describes the general principles, principal features, and advantages of the present invention. It should be understood by those skilled in the art that the present invention is not limited to the embodiments described above, which are given by way of illustration of the principles of the present invention, and that various changes and improvements may be made without departing from the spirit and scope of the present invention, and such changes and modifications are within the scope of the present invention as claimed. The scope of protection claimed by the present invention is defined by the appended claims and equivalents thereof.

What is claimed is:

1. A smoking path simulation system based on a robotic arm, comprising
   a case,
   the robotic arm fixedly provided in the case,
   a cigarette holder mounted at a working end of the robotic arm,
   a feeding device, a cigarette tapping device, a cigarette lighting device that are provided in the case and located at a periphery of the robotic arm, and
   an image acquisition device mounted at the working end of the robotic arm;
   wherein the cigarette tapping device comprises
      a cigarette tapping bracket located at the periphery of the robotic arm,
      a driving motor mounted at the cigarette tapping bracket,
      a pull rod provided at an output end of the driving motor, and
      a supporting plate mounted at the cigarette tapping bracket, configured to right a cigarette and provided with a groove;
   the cigarette lighting device comprises
      a cigarette lighting bracket located at the periphery of the robotic arm and
      a cigarette lighter mounted at the cigarette lighting bracket;
   the image acquisition device comprises
      a frame fixedly connected to the working end of the robotic arm and provided with N supporting rods,
      N cameras fixedly connected to different supporting rods respectively and having lenses facing the working end of the robotic arm, and
      N filling lights fixedly connected to the different supporting rods respectively and having light source surfaces facing the working end of the robotic arm, wherein N≥2;
   the feeding device comprises
      a complete machine frame located at the periphery of the robotic arm,
      a hopper,
      a hopper driving motor,
      a cigarette steering mechanism and
      a guide tube, and the hopper, wherein
      the hopper driving motor and the cigarette steering mechanism are mounted at the complete machine frame;
      a through groove for a single cigarette in a horizontal state to pass through is provided at an upper portion of the hopper, and a mounting panel is mounted on a front side of the hopper;
      the hopper driving motor is connected to the hopper and configured to drive the hopper to rotate, and under gravity, the single cigarette is obtained from untested cigarettes in the hopper through the through groove and falls into the cigarette steering mechanism;
      the cigarette steering mechanism is provided under the hopper, has an open upper end, and is provided therein with a slope configured to convert an axis of the single cigarette from a horizontal direction to a vertical direction;
      the slope in the cigarette steering mechanism has a lower end communicated with an inlet at a top end of the guide tube; and
      the guide tube is provided vertically.

2. The smoking path simulation system of claim 1, wherein the robotic arm carries the cigarette holder fixedly connected thereto to move from an initial position to a position under an outlet of the guide tube, an axis of the cigarette holder is superposed with an axis of the guide tube, the cigarette enters the cigarette holder through the guide tube, and after the cigarette holder clamps the cigarette, the robotic arm simulates spatial smoking actions of a consumer; and
   the axis of the cigarette holder and an axis of the working end of the robotic arm are kept consistent.

* * * * *